United States Patent
Ferber et al.

(10) Patent No.: US 7,347,382 B2
(45) Date of Patent: Mar. 25, 2008

(54) SYSTEM FOR SECURING PERSONAL CARDS

(75) Inventors: Andrew R. Ferber, New York, NY (US); Terrance Z. Kaiserman, Loxahatchee, FL (US); John Gentile, Montclair, NJ (US); Anthony Gentile, New York, NY (US); Juan Bravo, New York, NY (US)

(73) Assignee: T-ink, LLC, New York, NY (US)

( * ) Notice: Subject to any disclaimer, the term of this patent is extended or adjusted under 35 U.S.C. 154(b) by 105 days.

(21) Appl. No.: 11/052,384

(22) Filed: Feb. 7, 2005

(65) Prior Publication Data

US 2005/0211785 A1    Sep. 29, 2005

Related U.S. Application Data

(60) Provisional application No. 60/542,464, filed on Feb. 6, 2004.

(51) Int. Cl.
*G06K 19/06* (2006.01)

(52) U.S. Cl. .................. 235/492; 235/449; 235/380
(58) Field of Classification Search ............... 235/449, 235/492, 380, 375
See application file for complete search history.

(56) References Cited

U.S. PATENT DOCUMENTS

| | | | |
|---|---|---|---|
| 3,624,938 A | 12/1971 | Richard | |
| 3,868,057 A | 2/1975 | Chavez | |
| 3,876,865 A | 4/1975 | Bliss | |
| 4,186,944 A | 2/1980 | Pearce | |
| 4,216,577 A | 8/1980 | Badet et al. | |
| 4,230,344 A | 10/1980 | Bell, Jr. et al. | |
| 4,500,116 A * | 2/1985 | Ferro et al. | 283/92 |
| 4,591,189 A | 5/1986 | Holmen et al. | |
| 4,593,184 A * | 6/1986 | Bryce et al. | 235/449 |
| 4,614,861 A * | 9/1986 | Pavlov et al. | 235/380 |
| 4,707,594 A * | 11/1987 | Roth | 235/488 |
| 4,806,204 A | 2/1989 | Manfre et al. | |
| 4,925,215 A | 5/1990 | Klaiber | |
| 4,964,951 A | 10/1990 | Menyhert | |
| 5,016,919 A | 5/1991 | Rotondo | |
| 5,176,405 A | 1/1993 | Kaule et al. | |
| 5,180,901 A * | 1/1993 | Hiramatsu | 235/380 |
| 5,180,902 A * | 1/1993 | Schick et al. | 235/380 |
| 5,190,318 A | 3/1993 | Mantegazza | |
| 5,455,749 A | 10/1995 | Ferber | |
| 5,471,039 A | 11/1995 | Irwin, Jr. et al. | |
| 5,475,205 A | 12/1995 | Behm et al. | |

(Continued)

OTHER PUBLICATIONS

U.S. Appl. No. 09/753,849, filed Jan. 3, 2001 for Kaiserman et al. entitled "Method of Manufacturing Printed Circuit Boards."

*Primary Examiner*—Ahshik Kim
(74) *Attorney, Agent, or Firm*—Lerner, David, Littenberg, Krumholz & Mentlik, LLP

(57) ABSTRACT

A credit card comprises a plastic layer, a processor, and a keypad. The keypad provides the ability to input a code (e.g., a personal identification number (PIN) code) to the processor as a part of validating the transaction. Illustratively, the entry of a valid PIN code may cause the processor to trigger an alerting device as an indicator to the merchant that the holder of the credit card is authorized for its use.

9 Claims, 6 Drawing Sheets

U.S. PATENT DOCUMENTS

| | | |
|---|---|---|
| 5,567,037 A | 10/1996 | Ferber |
| 5,594,226 A | 1/1997 | Steger |
| 5,626,948 A | 5/1997 | Ferber et al. |
| 5,627,355 A * | 5/1997 | Rahman et al. ............. 235/380 |
| 5,973,420 A | 10/1999 | Kaiserman et al. |
| 5,997,044 A | 12/1999 | Behm et al. |
| 6,170,744 B1 | 1/2001 | Lee et al. |
| 6,188,506 B1 | 2/2001 | Kaiserman et al. |
| 6,311,350 B1 | 11/2001 | Kaiserman et al. |
| 6,315,329 B1 | 11/2001 | Greene |
| 6,355,140 B1 | 3/2002 | Murakami et al. |
| 6,390,375 B2 * | 5/2002 | Kayanakis ................... 235/492 |
| 6,491,215 B1 | 12/2002 | Irwin, Jr. et al. |
| 6,676,021 B1 * | 1/2004 | Luski et al. ................. 235/491 |
| 6,776,337 B2 | 8/2004 | Irwin, Jr. et al. |

\* cited by examiner

FRONT

- Protective Coating  601
- Four Color Process Printing  602
- Deformable Plastic  603
- Heating Circuit  604
- Hard Plastic  605
- Chemical Resistant  606
- Battery Chemicals  607
- Chemical Resistant  608
- Four Color Process Printing  609
- Protective Layer  610
- Magnetic Strip  611

BACK

FIG. 6

SYSTEM FOR SECURING PERSONAL CARDS

CROSS-REFERENCE TO RELATED APPLICATIONS

The present application claims the benefit of the filing date of U.S. Provisional Patent Application No. 60/542,464, filed Feb. 6, 2004, the disclosure of which is hereby incorporated by reference herein.

BACKGROUND OF THE INVENTION

The invention relates generally to personal cards, such as credit cards, and more particularly, to personal cards featuring electronics for authenticating transactions in which the cards are used.

Fraudulent use of personalized cards such as credit cards, debit cards, identification cards and the like is a serious problem. For example, credit card fraud causes at least an estimated $1 billion each year in losses in the United States alone. This fraud not only affects the credit card companies but, more importantly, the consumers who wind up paying for the fraud by way of higher finance charges, annual fees, and increased costs for law enforcement.

Credit cards have, at best, low-level security features built in. If a credit card is stolen, and the loss of the credit card is not reported for deactivation, the stolen credit cards can be used in any store—especially since not all merchants carefully check the user's identification (ID). Further, if the ID was stolen along with the credit card—then even this level of security may be overcome.

Similarly, there are other methods resulting in fraudulent charges—even if the owner still possesses the credit card. For example, "skimming" is a technique of taking a credit card and sliding it through a "wedge" device, which reads and stores the information on the magnetic strip of the credit card. This can occur whenever the owner hands over the credit card to someone else who then briefly disappears with the card (e.g., a waiter in a restaurant). The information stored on this "wedge" device can then be used to make credit cards with the owner's credit card number. Charges with this type of counterfeit credit card may not be detected until the next billing cycle.

What is needed is a simple, cost-effective, higher form of security on a credit card that is capable of significantly reducing, if not eliminating, common types of credit card fraud.

SUMMARY OF THE INVENTION

The present invention provides a higher form of personal card security—that is both cost-effective and minimally affects existing merchant transactions. The security provided by the cards is implemented electronically, thereby facilitating the use of a "PIN code" type system to prevent fraudulent use of the card. The circuitry used in the card is formed by printing with conductive ink, and is thus less expensive than comparable circuitry implemented through conventional printed circuit board technology.

The present invention can be used to protect any kind of personal card against fraudulent use. Nevertheless, for purposes of clarity of presentation the invention will be described in the context of a credit card. In light of the description, application of the invention to other types of cards will become apparent.

In accordance with one aspect of the invention, a credit card authentication system comprises a credit card, a keypad and electronics for authenticating use of the credit card.

In an embodiment of the invention, a credit card comprises a plastic layer, a processor, a keypad, an alerting device, a magnetic strip for storing credit information, and a means for providing power. The keypad provides the ability to input a code, e.g., a personal identification number (PIN) code, to the processor as a part of validating a transaction. Illustratively, the entry of a valid PIN code causes the processor to trigger the alerting device as an indicator to the merchant that the holder of the credit card is authorized for its use.

In another embodiment of the invention, the credit card comprises a plastic layer, a processor, a keypad, an indicator, and a magnetic strip for storing the credit information. The keypad provides the ability to input a code, e.g., an activation number, to the processor as a part activating the card for use. The entry of a valid activation number causes the processor to trigger the alerting device as an indicator to others that the credit card is an original—and not a counterfeit.

In another aspect of the present invention, a conductive composition is provided to a credit card substrate. This composition can be applied onto the substrate using existing production equipment by the means of offset printing, screen-printing, flexographic printing, gravure printing, pad printing, ink jet, laser printing, digital printing of all types, bubble jet, letterpress and other methods of applying an ink or coating onto a substrate. It also can be spray coated, dip coated, reverse roll coated, impregnated, saturated, hot stamped, powder coated and virtually applied by every other know application method or combination of methods. This substrate, when attached to electronics, becomes an interactive medium.

Another aspect of the present invention uses membrane switch technology disposed on a surface of the credit card. When activated, an action (such as sending an electronic signal) would commence. This could be in one layer or more than one layer of conductive compositions.

Other activation methods that do not use conductive compositions may also be used. For example, a motion sensor, moisture sensor, temperature sensor, pressure sensor, light sensor, smoke sensor, barometric sensor, magnetic sensor, sound sensor, bend sensor, circuit breaker, odor sensor and the like.

The credit card may further comprise an alerting device, for providing a visual indication and/or an audible indication of the authentication state.

In accordance with another aspect of the invention, an electrical system, e.g., electronics, is provided in the credit card. The electrical system comprises a substrate, a conductive composition arranged on a substrate, a power source having a positive terminal and negative terminal wherein the conductive composition is arranged between the positive and negative terminals of the power source.

The electronics can utilize all existing types of power, both AC and DC, including, but not limited to, batteries, solar cells, generators and alternators. The electronics can utilize all speaker types, circuits and chips of all memory sizes both masked (fixed recording) and reprogrammable memory (rewritable recording.)

The electronics can be attached to the credit card substrate by way of glue, heat seal, sonic welding, cold or hot laminating, pressure sensitive adhesive or by any other means in a permanent or temporary manner. The electronics may be fixed and the conductive compositions may attach in a permanent or non permanent way to the substrate.

Thus, it is an object of the invention to make credit cards resistant to counterfeiting while at the same time being easily authenticated and verified without entailing a significant cost increase in manufacturing.

It is another object of the invention to make it easy to allow a merchant, or retailer, to validate a card on-site.

These and other objects, features and advantages of the present invention will be more readily understood when considered in view of the following detailed description of the preferred embodiments and accompanying drawings.

BRIEF DESCRIPTION OF THE DRAWINGS

FIG. 6 shows a cross-sectional view of a preferred embodiment of a credit card in accordance with the invention.

DETAILED DESCRIPTION

Figure 1:
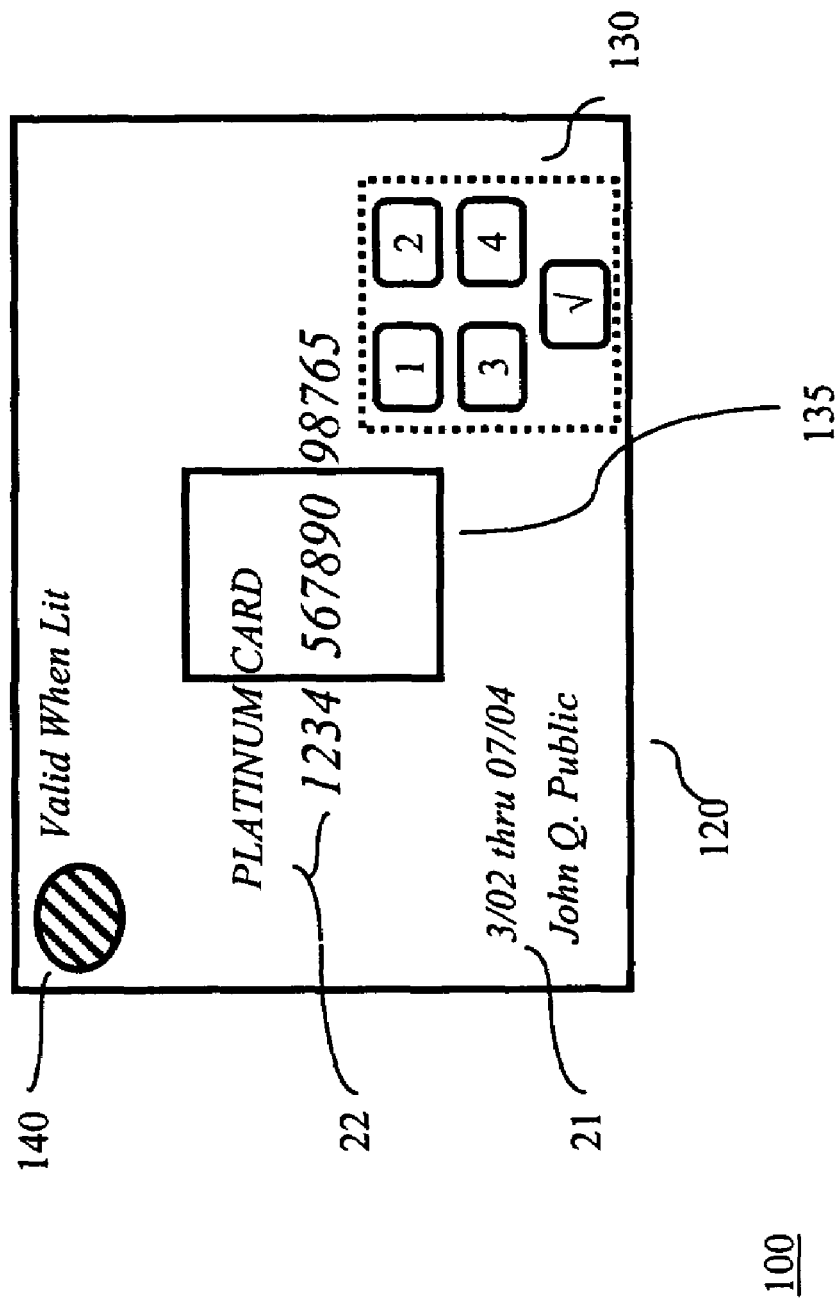
FIG. 1 illustrates one embodiment of a credit card in accordance with the principles of the invention.

The present invention is applicable to all kinds of personal cards. Nevertheless, in the interest of brevity the invention will be described in the context of a credit card. In view of the description, application of the invention to other types of cards will become apparent.

The following U.S. Patents are hereby incorporated by reference: U.S. Pat. No. 6,188,506 issued Feb. 13, 2001 to Kaiserman et al., entitled "Conductive Color-Changing Ink;" and U.S. Pat. No. 5,567,037, issued Oct. 22, 1996 to Ferber, entitled "LED for Interfacing and Connecting to Conductive Substrates." In addition, U.S. patent application Ser. No. 09/753,849, filed Jan. 3, 2001, for Kaiserman et al., entitled "Method of Manufacturing Printed Circuit Boards" is hereby incorporated by reference. In addition, the inventive concept is implemented using conventional programming techniques, which are not described herein.

As described further below, a credit card authentication system comprises a credit card, a keypad and electronics for authenticating use of the credit card.

In one aspect of the invention, the credit card could be comprised of conventional inks presently used in the printing or molding of paper or plastic materials and a single layer or multiple layers of conductive compositions. Such a composition is both novel and unobvious over materials and systems known in the prior art.

In another aspect of the invention, the credit card comprises one, or more, layers, or substrates, of plastic material. As used herein, the term "plastic" is intended to cover various polymers and, thus, should be construed to include polymeric materials of all types.

Various coating methods can be used to apply a conductive composition to a surface of one or more of these layers of the credit card. Such coating methods include screen printing, gravure printing, flexographic printing, offset printing, spray coating, knife coating, electrostatic coating, reverse roll coating, ink jet printing, laser printing and various other known printing and coating methods, such as those discussed in U.S. Pat. No. 5,455,749, issued Oct. 3, 1995 to Ferber, entitled "Light, Audio and Current Related Assemblies, Attachments and Devices with Conductive Composition;" U.S. Pat. No. 5,973,420, issued Oct. 26, 1999 to Kaiserman et al., entitled "Electrical System having a Clear Conductive Composition;" and U.S. Pat. No. 5,626,948, issued May 6, 1997 to Ferber et al., entitled "Electrical System having a MultiLayer Conductive Composition;" the subject matter of which have all been incorporated by reference herein. The conductive composition may be a conductive ink either clear or transparent in color, sometimes referred to as water white or, in a visible color that is transparent, translucent or opaque in appearance.

Coatings or printing of conductive compositions may be printed on one side of a substrate, printed on both sides separated by a dielectric material, printed on both sides separated by a material that has a different resistance then the coatings or applied in such a manner as to pass from one side to the other side with continuity.

As an option, "dummy" conductors or circuit elements that are not part of the actual circuitry can be included when the conductive composition is applied in the interest of impeding copying of the actual circuitry. Further, a "dummy layer" of such conductors or circuit elements can be included in the layered structure of the card in order to hide or camouflage the "real" circuitry. Still another, anti-copying measure is to laminate the layers of the card such that any attempt to access an inner layer would result in destruction of that layer.

An illustrative credit card 100, in accordance with the principles of the invention, is shown in FIG. 1. Credit card 100 comprises one, or more, substrates as represented by top surface 120. On top surface 120 there is printed (like any conventional credit card) a text portion 22 comprising the card type and account number, along with a text portion 21 comprising the holder's name and validity dates. Other information, or indicia, may also appear on the surface of a credit card, e.g., a "member since" indicator, credit card company name, etc. These are not shown for simplicity. As an option, the credit card may include a magnetic strip 125. The strip can be used to store the same kind of information that is commonly stored in current credit cards. Also, as shown in FIG. 1, the magnetic strip can be located on the backside of the card towards the top, as is the current convention. However, it should be noted that non-conventional types of information may be stored on the strip and the strip may be located at any position on the card.

In addition, credit card 100 includes a "SMART chip" 135 and, as such, is a form of smart credit card. A smart credit card works and looks just like a regular credit card but differs from a regular credit card in that it contains an electronic chip (the SMART chip). SMART chip 135 is embedded on top surface 120 of credit card 100 and comprises a microprocessor with 32 Kbytes of memory. As known in the art, the SMART chip works in conjunction with a "reader." The SMART chip is able to perform some cryptographic functions such as creating or checking a digital signature. The primary purpose of the SMART chip is to authenticate the identity of the cardholder via the reader. For this purpose, the SMART chip may hold a public/private key pair together with a digital certificate. The certificate asserts that the public key on the card belongs to the person associated with a particular identifier; this assertion is made by a Certificate Authority run by the University Card Services. The corresponding private key remains on the card: it cannot normally be extracted, but is used by the cryptographic functions of the SMART chip.

The private key on the credit card is protected by a PIN (personal identification number) code. A PIN code is assigned at random when the credit card is issued; it may also be possible for individuals to change their PIN codes at a later date. If the PIN code is entered, via the reader, incorrectly three times in succession, the SMART chip "blocks" the card from further use. The card must then be returned to the card office where it can be "unblocked" if staff are assured that it is in the hands of the rightful owner.

In accordance with one aspect of the invention, a user of a credit card is authenticated without requiring the use of external devices, such as a reader. Credit card 100 also comprises, on top surface 120, an input device 130 and an alerting device 140, along with an optional text caption "Valid When Lit."

As shown in FIG. 1, input device 120 is illustratively a keypad comprising 5 keys. These keys are implemented using, e.g., conductive touch-sensitive ink as described in above-mentioned U.S. Pat. No. 5,626,948, membrane switches, pressure switches, bend and/or flex sensors, buttons or other known activation devices. Either a human touch or another object touching these switches would actuate the switch.

Alerting device 140 is illustratively a portion of top surface 140 comprising thermochromic ink, i.e., with an electronic color change capability. The latter is described in above-mentioned U.S. Pat. No. 6,188,506.

Figure 2:
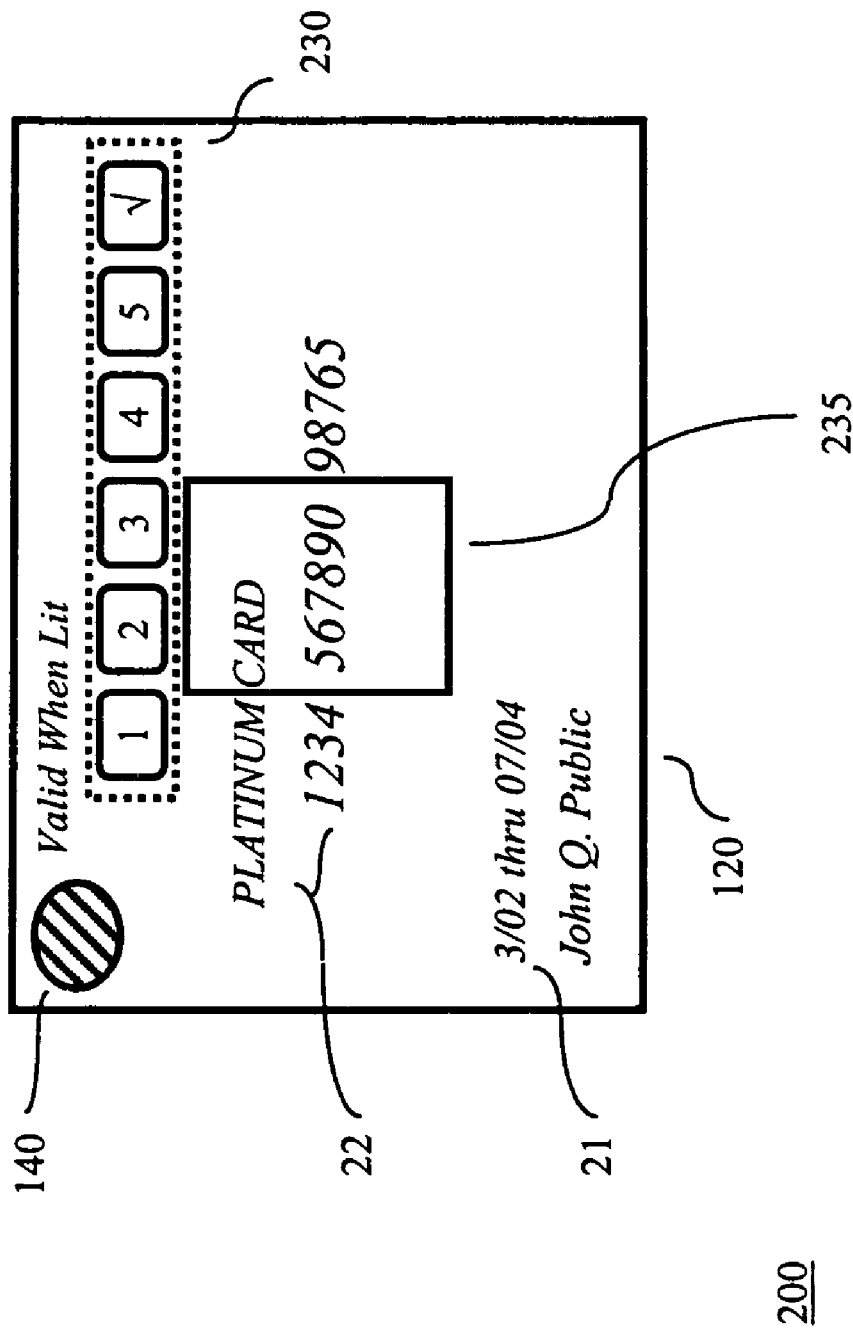
FIG. 2 illustrates another embodiment of a credit card in accordance with the principles of the invention.

Turning now to FIG. 2, a different arrangement of a credit card in accordance with the principles of the invention is shown. Credit card 200 is similar to credit card 100 of FIG. 1 except for the location, shape and size of the input device. As such, like numbers indicate similar elements and are not described further. In credit card 200, an input device 230 is arranged along a top portion of surface 120. Input device 230 is illustratively a keypad comprising a linear array of six keys. The card may also include a magnetic strip like the strip shown in FIG. 1.

Figure 3:
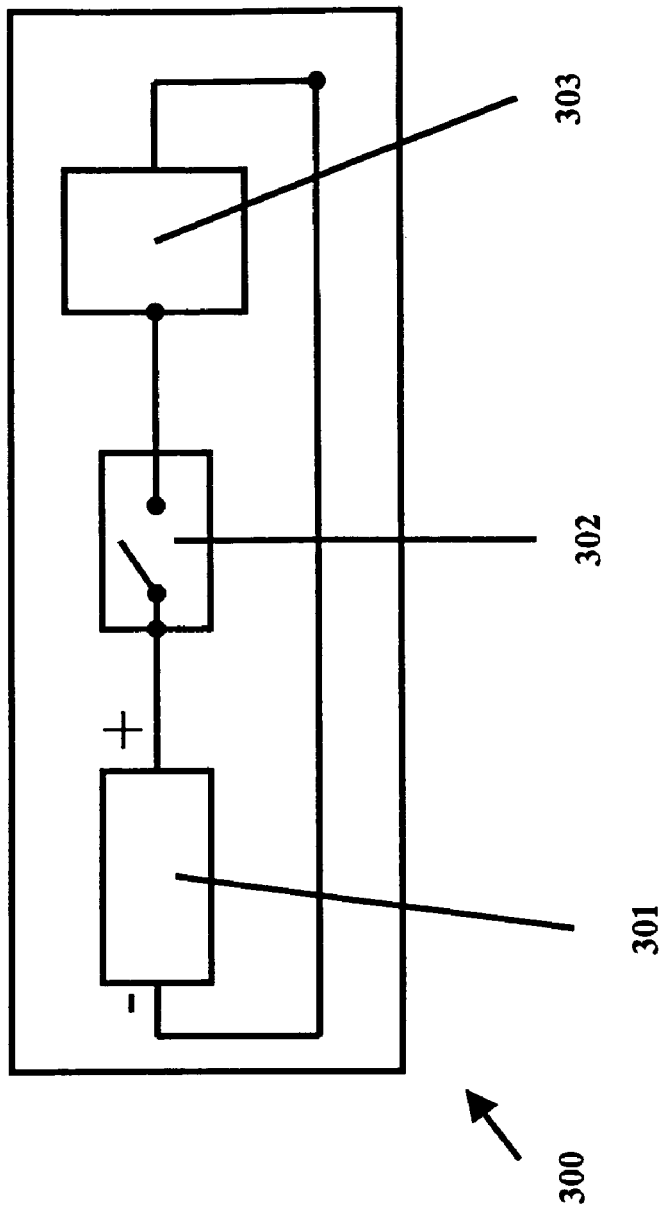
FIG. 3 shows an illustrative structure of a credit card in accordance with the principles of the invention.

An illustrative structure for a credit card 300 comprising an electrical authentication device is shown in FIG. 3. The structure comprises a thin film battery 301 for providing power, an input device and switch 302, and a SMART chip 303 laminated into the credit card profile as indicated. The battery types that may be used as battery 301 include rechargeable batteries and non-rechargeable batteries. Examples of batteries that may be employed are nickel cadmium batteries, lithium ion batteries, printed batteries and the like. Moreover, a solar cell may be employed in lieu of a battery.

Figure 4:
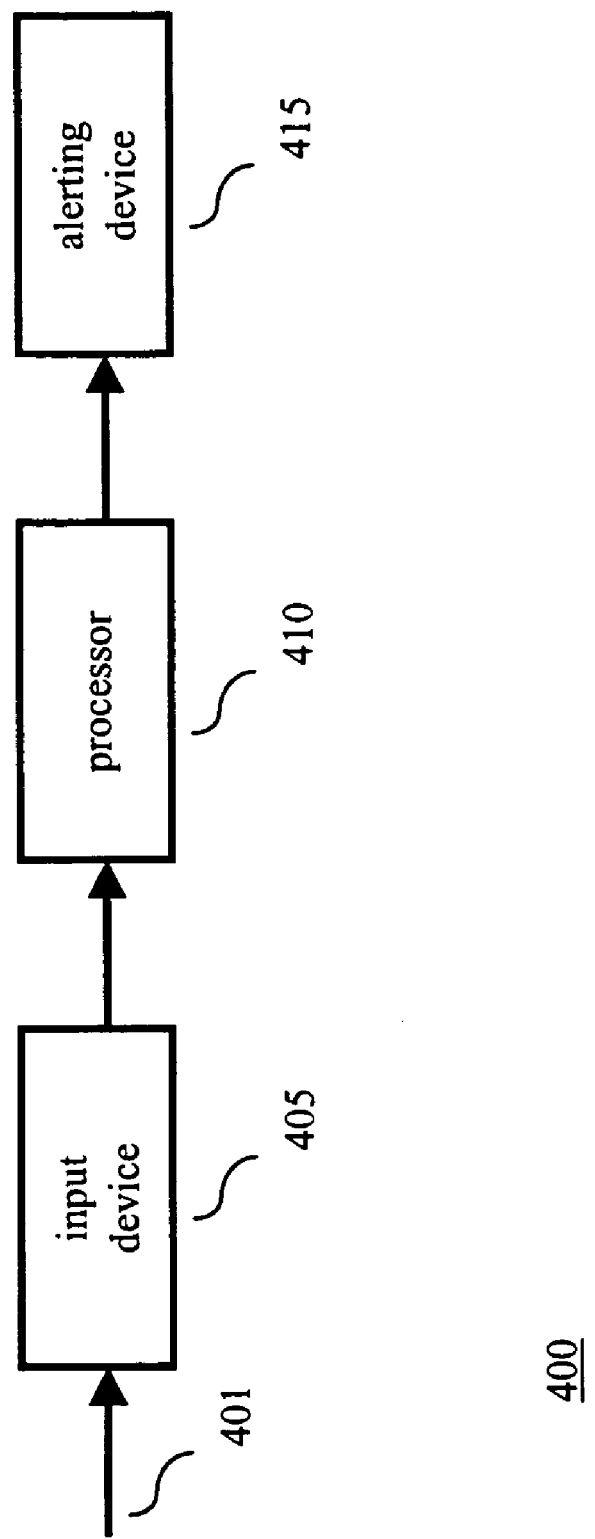
FIG. 4 illustrates an illustrative block diagram of an electrical authentication device for use in a credit card in accordance with the principles of the invention.

An illustrative block diagram of an electrical authentication device for use in a credit card is shown in FIG. 4. Electrical authentication device 400 comprises input device 405 (e.g., representative of input device 130, of FIG. 1, or input device 230, of FIG. 2), a processor 410 (e.g., the above-mentioned SMART chip) and alerting device 415 (representative of alerting device 140 of FIGS. 1 and 2). Input device 405 receives information as represented by arrow 401 (e.g., a key press). Processor 410 is a stored-program control processor and includes memory (not shown) for executing program data stored therein.

In accordance with an aspect of the invention, a personal identification number (PIN) code is programmed a priori into processor 410 (e.g., its memory). Alternatively, conductive ink is used to print a conductive pattern with numerous pairs of resistors and conductors on a substrate of the credit card. Each resistor/conductor pair is tied between a positive voltage and ground such that a predefined logic level, or state, can be associated therewith. Disabling, or blowing, one element of the pair, e.g., the conductor, causes the logic level to change to another state. In this way, a PIN code can be a priori set in the credit card before distribution.

Figure 5:
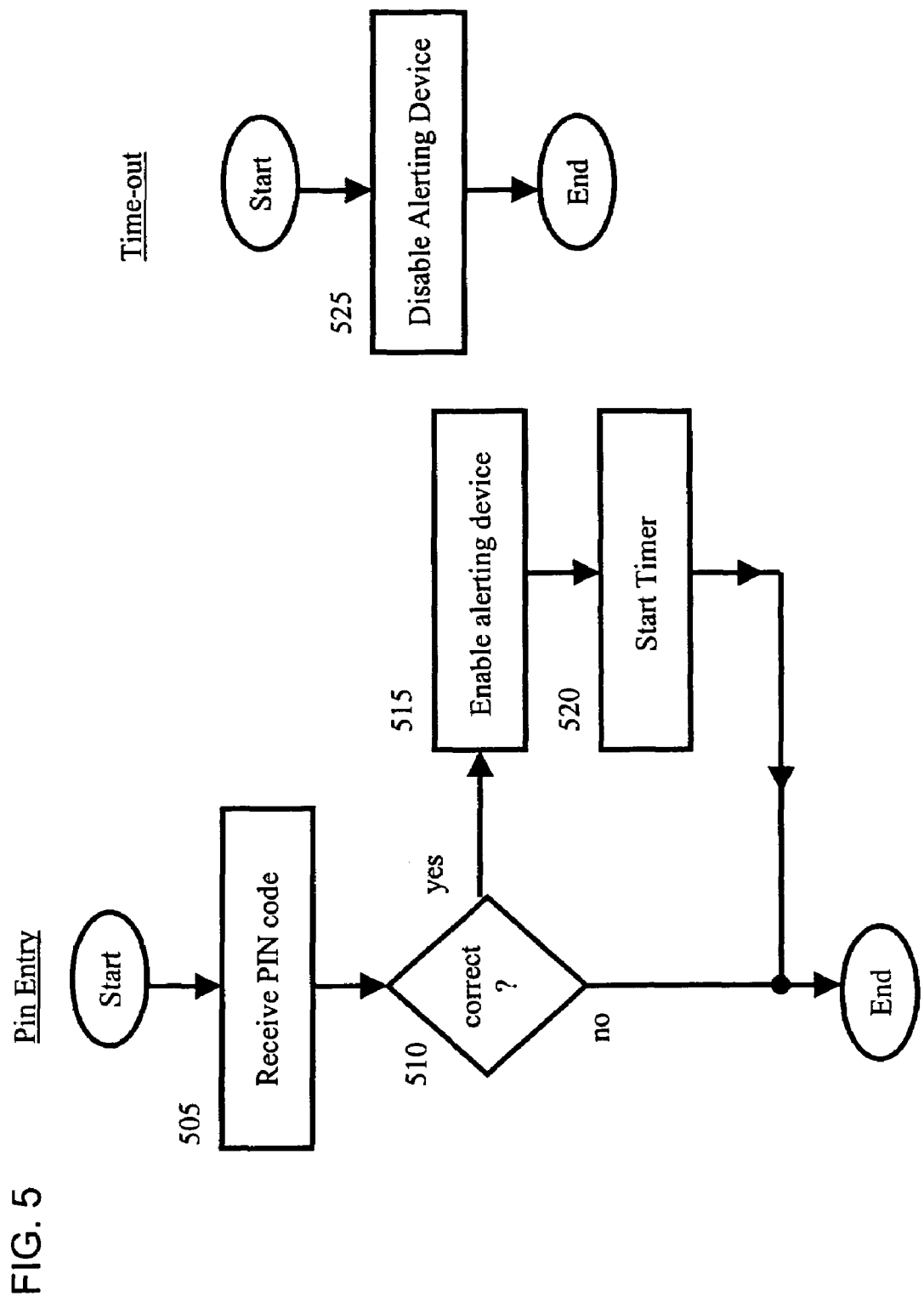
FIG. 5 shows an illustrative flow chart for use in a credit card in accordance with the principles of the invention.

Turning now to FIG. 5, an illustrative flow chart is shown for use by the electrical authentication device. As noted above, the credit card has a PIN code stored therein. In order to authenticate use of the card, the user must first enter the PIN code, via the input device. As such, in step 505, the electrical authentication device (e.g., processor 410 of FIG. 4), receives a sequence of k digits from a set of K digits. (In the context of FIG. 1, K=4; while in FIG. 2, K=5.) The end of the k digit sequence is represented by use of the "√" key. This is the "entered PIN code." After the end of the sequence has been detected by processor 410, a comparison is made to the stored PIN code. If the correct PIN code has been entered, processor 410 enables, in step 515, the alerting device such that the alerting device turns a predefined color to indicate the holder of the credit card is an authorized user of the card. In addition, processor 410 initiates a timer in step 520. Upon expiration of the timer, processor 410 disables the alerting device in step 525 such that the predefined color is no longer shown by the alerting device. The thermochromic ink is used to show semi-permanent color changes and/or text.

As another variation of the above-described method, the magnetic strip for storing the credit card information is blocked from being read until the proper PIN code is input by the user. Upon authentication by processor 410, a timer (e.g., implemented in software) unblocks the magnetic strip for a preset time allowing the card to be used for that given window of time.

In a preferred implementation of the strip blocking embodiment, the reading of the magnetic strip is blocked by emission of a noise signal. The noise signal is preferably a pulsed signal and it is emitted until the proper PIN code is input. Upon entry of the proper PIN code, the processor 410 turns off the noise generator and the strip can be read.

In any event, if the entered PIN code does not match the stored PIN code—nothing happens. Alternatively, processor 410 can de-actuate the card. For example, processor 410 can trigger another portion of the alerting device, or a different alerting device, to indicate that the card may not be in the possession of an authorized user by showing a different color. As yet another variation, processor 410 can keep track of the number of incorrect attempts and, if a predefined number is reached (within or without a predefined time period), trigger another portion of the alerting device, or a different alerting device, to indicate that the card may not be in the possession of an authorized user by showing a different color. Similarly, electronics could be added to wipe the magnetic strip of account information, or erase the PIN code from memory, after a predefined number of incorrect attempts within, or without, a predefined time period.

In accordance with an aspect of the invention, the above-described authentication device and method can be used to activate, actuate, or de-actuate, a credit card and to verify in the presence of a merchant an authorized user of the credit card. Although the illustrative credit card was shown with one alerting device—the alerting device can have more than one type of thermochromic portion (e.g., with different color definitions), or more than one alerting device can be used, to separately show a valid activation and valid authentications.

Other variations are possible. For example, the alerting device can comprise a blowing agent, such that self-embossing or self de-embossing occurs as a function of the authentication of the user. In addition, instead of thermochromic ink as the alerting device, a surface mounted LED (light emitting diode) may be used that will light up upon entry of a correct PIN code thereby authenticating the user to the retailer. Alternatively, or in addition to, the alerting device may generate an audio signal (i.e., a sound) appropriate to the authentication status of the user.

As described above, one aspect of the invention provides the ability to make credit cards resistant to counterfeiting while at the same time being easily authenticated and verified without entailing a significant cost increase in manufacturing. In addition, another aspect of the invention makes it easy to allow a merchant, or retailer, to validate a card on-site.

As noted above, conductive compounds may be used. A conductive compound may be of any color, formulation type and conductivity range. Further, a conductive compound, by way of example, may comprise polyesters, polyamides, poly vinyl alcohol, poly vinyl acetate, poly vinyl chloride, alkyds, phenolics, acrylics and/or polyurethanes or any combination thereof for as a binder system. In addition, a conductive compound, by way or example, may utilize all known conductive materials including but not limited to, carbon, graphite, silver, gold, platinum, palladium, nickel, stainless steel, other conductive metals, conductive polymers, acids, salts, glycols, water or antistats of all known types including combinations of conductive materials. Additives to a conductive compound may utilize any known humectants, solvents, pigments, wetting agents, thickeners, fillers or combination of materials.

Turning to FIG. 6, there is shown a cross-sectional view of a preferred embodiment of a credit card in accordance with the invention. The figure is oriented such that the front of the credit card is facing the top of the page and the back of the credit card is facing the bottom of the page. The thickness of the layers has been greatly exaggerated and the relative thicknesses of the layers have not been preserved.

As can be seen from the figure, the card consists of 11 layers. From the top down, the card includes a protective layer 601 over a layer that includes four color process printing 602. Under the printing layer 602 lies a layer of deformable plastic 603 that, in turn, lies over a heating circuit layer 604 and a layer of hard plastic 605. The combination of the deformable plastic layer 603, heating circuit layer 604 and hard plastic layer 605 can be used to implement the self-embossing feature of the invention. More specifically, a portion of the deformable plastic may be deformed in response to directed heat generated by heating circuitry in layer 604.

Beneath hard plastic layer 605 is a chemically resistant layer 606, a battery chemicals layer 607 and a chemically resistant layer 608. The chemically resistant layers 606 and 608 contain the battery chemicals. The battery chemicals layer 607 may include one or more sub-layers, such as an anode layer and cathode layer. In any event, the battery chemicals layer is used to form a dry cell battery, wet cell battery or the like, and provides power for the circuits on the card.

Below chemical resistant layer 608 is a second layer having four color process printing 609. Under layer 609 is a protective layer 610. A magnetic strip layer 611 lies under protective layer 610 and, in a preferred embodiment, does not extend over the full surface of protective layer 610. That is, the magnetic strip may cover only a narrow swath of protective layer 610.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A card capable of user authentication, comprising:
   an input interface through which a user of the card can enter a personal identification number; electronics for comparing an entered personal identification code to a stored reference code; and
   thermochromatic ink adapted to change color when the entered code corresponds to the stored reference code.

2. The card of claim 1, wherein the electronics comprises conductors formed from conductive ink.

3. The card of claim 2, wherein the card comprises multiple layers including at least one layer made up of circuit elements formed using conductive ink.

4. The card of claim 3, wherein the card further comprises at least one layer of dummy circuit elements formed using conductive ink.

5. The card of claim 1, wherein the input interface comprises a multiple of keys.

6. The card of claim 5, wherein the input interface comprises a multiple of alpha/numeric keys.

7. The card of claim 1, further comprising a magnetic strip for storing information.

8. The card of claim 7, further comprising a noise generator for blocking reading of the magnetic strip until an entered code corresponds to the stored reference code.

9. The card of claim 8, wherein upon entry of an entered code corresponding to the stored reference code, the noise generator is turned off for a predetermined period of time.

* * * * *